United States Patent
Fabre

[11] 3,745,713
[45] July 17, 1973

[54] CUTTING-OFF MACHINES

[75] Inventor: Arthur Fernand Fabre, Pyrenees-Orientales, France

[73] Assignee: Nobel-Bozel, Puteaux, Hauts-de-Seine, France

[22] Filed: June 23, 1971

[21] Appl. No.: 155,703

[30] Foreign Application Priority Data
Feb. 22, 1971 France .............................. 7105990

[52] U.S. Cl. ................................................ 51/34 C
[51] Int. Cl. ......................... B24b 7/00, B24b 9/00
[58] Field of Search ......................................... 51/34

[56] References Cited
UNITED STATES PATENTS
2,922,257  1/1960  Else........................................ 51/34 C
2,774,191  12/1956  Bouchez................................ 51/34 C
1,914,413  6/1933  Elbert..................................... 51/34 C
2,769,280  11/1956  Comstock............................. 51/34 C

*Primary Examiner*—James L. Jones, Jr.
*Attorney*—Karl W. Flocks

[57] ABSTRACT

The invention deals with an improved machine for cutting off metal sheets.

The improvement consists in the fact that a carriage, movable along a horizontal guiding rail and bearing an arm at the extremity of which is mounted a cutting-off disc rotated at high speed, is given simultaneously a continuous to-and-fro movement in the direction of cutting and an intermittent movement of translation in the direction of cutting brought into action by a depth guide for the cutting-off wheel, by means of a suitable transmission system.

This improvement renders automatic the opration of the cutting-off machine.

4 Claims, 11 Drawing Figures

PATENTED JUL 17 1973　　　　　　　　3,745,713

INVENTOR
ARTHUR FERNAND FABRE

BY　KARL W FLOCKS

ATTORNEY

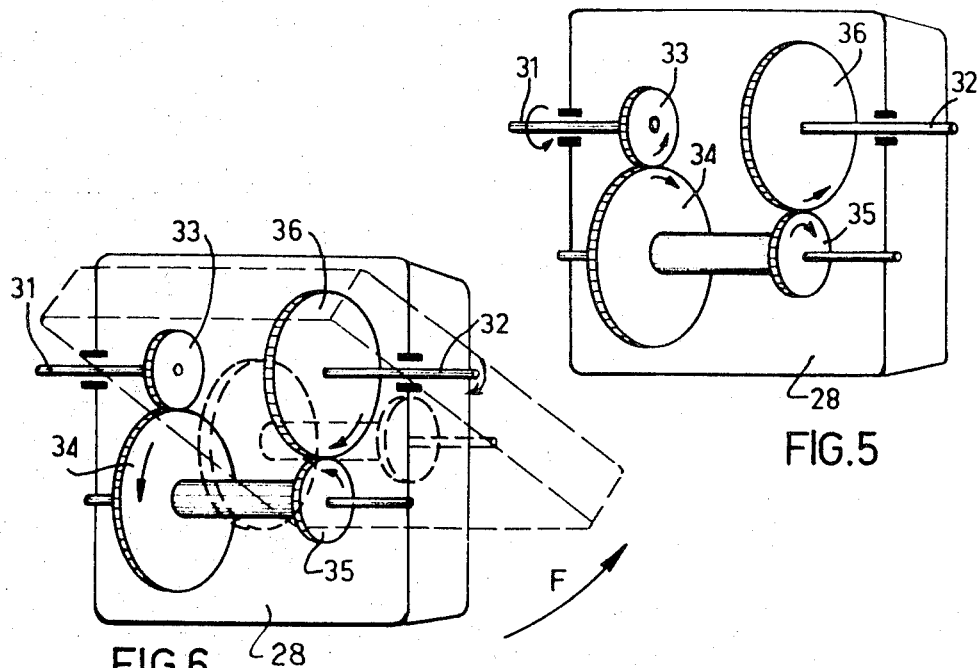
FIG.5
FIG.6
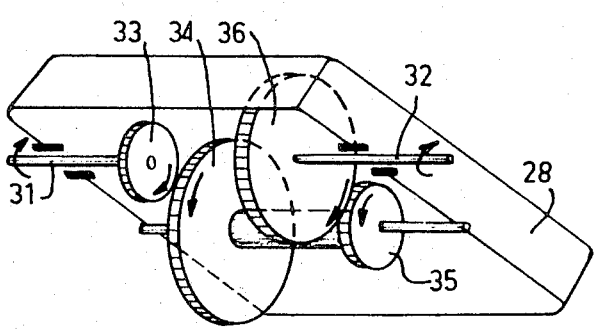
FIG.8
FIG.7

CUTTING-OFF MACHINES

The present invention relates to improvements in machines for cutting-off or parting metal sheets, especially sheets of plated metals, and in particular an automatic device employed for such cutting-off operations.

In order to cut-up plated metals, the most universally employed method is parting with a grinding wheel. In fact, sawing and milling are slow and expensive operations, cutting-up with the oxi-acetylene torch is not consistent with the presence of the plating metal, and the capacities of the plasma arc are very small in this field.

On the other hand, cutting-off has generally the advantage of giving a clean cut with a very good appearance, without increase in temperature, irrespective of the nature of the plating metal. Unfortunately, the cutting-off machines at present existing are designed for cutting metal sheets of relatively small section and do not permit cutting in an industrial manner of sheets of medium or large thickness.

The present invention supplied this deficiency by proposing an apparatus for cutting-up metal sheets of a known type but which is improved in order to render its operation automatic.

Cutting-off machines for sheet metal are already known in the prior art, comprising a parting grinding disc to which is given a very high speed of rotation and which is mounted on the end of an arm oscillating freely about an axis and fixed to a carriage capable of being given either a movement of translation or horizontal advance or an alternating or reciprocating motion, also horizontal and in the same direction as the lateral movement.

According to the present invention, a cutting-off machine of this kind is modified in order that the carriage, continuously given a reciprocating movement, can also be given a lateral movement which is automatically indexed to the condition of advance of the cut.

A first improvement according to the invention consists of a depth guide having a shape and position appropriate to the sheet metal to be cut and which serves to guide the approach of the grinding wheel on the sheet and to limit its downward movement. In addition, an electric contact may control the lateral movement of the carriage when a cam roller mounted on the end of the grinding wheel shaft comes into contact with the depth guide.

A second improvement according to the invention which may be combined with the first, consists of transmitting to the carriage, separately or simultaneously through the intermediary of a casing, the lateral movements produced by a motor speed-variation gear and the to-and-fro movement produced by a plate-crank assembly actuated by a motor-driven speed-reduction gear.

The invention will now be described with reference to a preferred embodiment which is illustrated by means of the accompanying drawings, in which:

FIGS. 5, 6, 7 and 8 show the operation of an example of construction of a casing employed for controlling the movements of the carriage in accordance with the invention;

Figure 11:
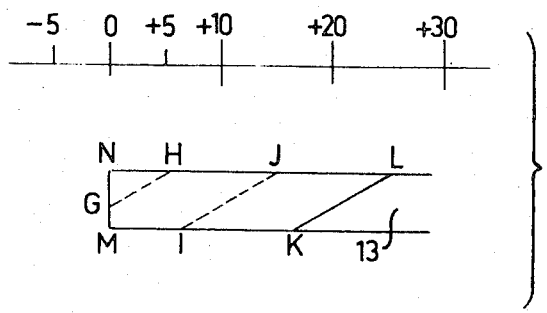

and FIG. 11 represents a vertical section of the metal sheet to be cut-up.

Figure 1:
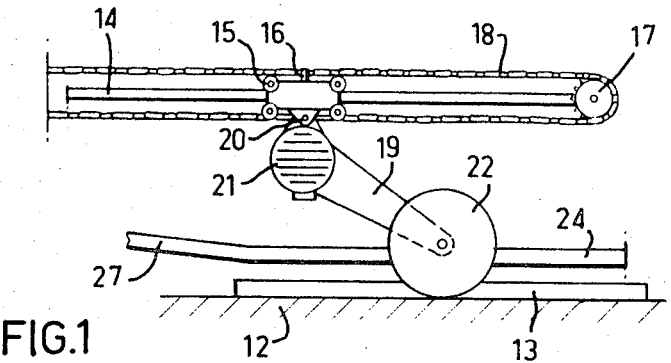
FIG. 1 is a general diagram of a device according to the invention.

Referring more particularly to FIG. 1, a frame (not shown) supports a horizontal work-table 12, on which can be fixed the metal sheets 13 to be cut-up, and it supports a horizontal rail 14 which serves to guide the wheels 15 of a carriage 16.

The carriage 16 is made fast for movement with a driving wheel 17 by means of a chain transmission 18.

This carriage 16 is connected to an arm 19 which is capable of pivoting freely about a shaft 20, horizontal and perpendicular to the guiding rails 14.

This same carriage 16 carries a motor 21, the movement of rotation of which is transmitted to the grinding wheel 22 by any known type of device.

The vertical displacement of the grinding wheel 22 during the course of the operation of cutting-up the sheet 13 is effected freely by the action of its own weight, to which is added a part of that of the arm 19.

This displacement is limited downwards in order to prevent the grinding wheel from penetrating too deeply into the work-piece. To this end, at the extremity of the grinding wheel shaft is mounted a cam roller 23 which can come into contact with a depth guide 24 (see FIG. 3).

Figure 3:
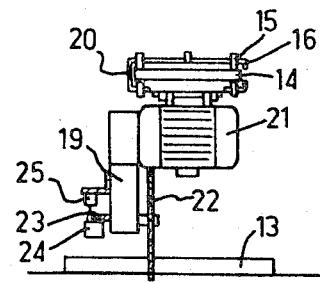
FIG. 3 is a diagram of the system of limitation of the vertical movement of the grinding wheel and of the device for tripping the forward movement of the carriage.

This guide has a shape and position suited to the metal sheet to be cut and such that when the roller 23 is in contact with the guide, the grinding wheel passes into the sheet by an amount slightly greater than the thickness of this latter (see FIGS. 1 and 3).

When the roller 23 comes into contact with the guide 24, thereby indicating that the grinding wheel has emerged and that at this point the sheet has been completely cut, an electric contact 25 is made and trips the forward or advance movement of the carriage.

As soon as the grinding wheel 22 again makes contact with the sheet 13 to be cut-up, it moves upwards, the roller 23 no longer touches the guide 24 and the forward movement of the carriage stops.

This forward movement of the carriage is controlled by a motor-driven speed-varying gear 26 which operates intermittently, when it is energized by the electric contact 25.

In addition, the guide 24 may have, on the side of the carriage 16, a particular form 27 raised towards the top (see FIG. 1) so as to guide the first approach of the grinding wheel to the metal sheet.

Figure 2:
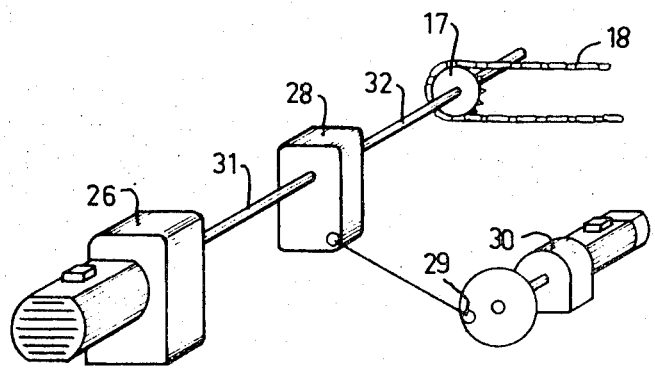
FIG. 2 is a diagram of the automatic device which gives the carriage a reciprocating movement and an advance movement.

The working principle of the automatic device for controlling the movements of the cutting-off machine according to the invention is illustrated in FIG. 2.

The lateral or forward movement of the carriage is caused by the movement of rotation of a motor-driven speed-varying device 26, transmitted by means of an intermediate casing 28 to the wheel 17 which drives the carriage.

The alternating or reciprocating movement of the carriage, which takes place in the same direction as the lateral movement of this latter, is due to the oscillations of the casing 28 produced by a plate-crank assembly 29 actuated by a motor-driven reduction gear 30.

Figure 4:
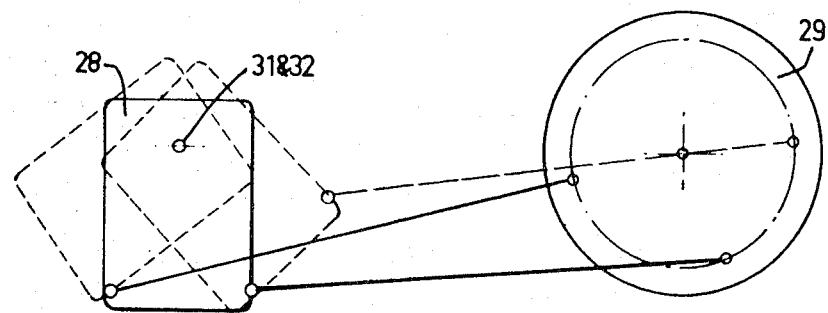
FIG. 4 is a diagram of the transmission of a circular movement to a casing, and of its conversion to a reciprocating motion.

FIG. 4 illustrates the alternating movement of the casing 28 transmitted by the plate-crank assembly 29 and the maximum amplitudes of the casing in its movement of oscillation around the half-shafts 31 and 32 are shown in broken lines.

FIGS. 5 to 8 explain the operation of a first example of construction of the casing 28, comprising a transmission with an epicyclic gear between the input shaft 31 and the output shaft 32.

This gear comprises four toothed wheels 33, 34, 35 and 36; the first toothed wheel 33 has for its axis the input shaft 31 and is in engagement with the wheel 34, which is the wheel of largest diameter and coaxial with a wheel 35 having a diameter close to that of the wheel 33. Finally, the wheel 35 is in engagement with the last toothed wheel 36 having the largest diameter and the axis of which is the output shaft 32 which corresponds to the axis of the driving wheel 17 of the carriage. The shafts 31 and 32 and the shaft of the satellite wheels 34 and 35 are parallel.

Referring now to FIG. 5, the casing 28 remaining fixed, if the input shaft 31 rotates at a certain speed, the toothed wheels 33, 34, 35 and 36 rotate in the direction of the arrows indicated in this figure and the output shaft 32 will be driven at a speed which is $n$ times smaller, where $n$ is the reduction ratio of the casing.

Referring now to FIG. 6, the input shaft 31 remaining fixed, if the casing 28 rotates in the direction indicated by the arrow F in order to move from the position shown in full lines to the position marked in broken lines, the wheel 33 remains fixed, the wheels 34, 35 and 36 rotate in the directions indicated by the arrows. In order to determine the amplitude of the rotation of the wheel 36 and in consequence of the output shaft 32 during the couse of this operation in which the input shaft is fixed, it will be divided into two stages.

In a first stage shown in FIG. 7, it is assumed that all the input shafts 31 and output shafts 32 and the shafts of the casing 28 rotate through 45° in a first direction indicated by the arrow F.

In a second stage shown in FIG. 8, it is assumed that the casing remains fixed in the position inclined at 45°, which corresponds to the final position of FIG. 7, the input shaft 31 is rotated through 45° in the direction opposite to that indicated by the arrow F in FIG. 7. The various wheels rotate in the directions indicated and it will be observed that the output shaft 32 turns through $n$ times 45° in the same direction as the input shaft 31.

In consequence, the position of FIG. 6 is equivalent to the sum of the movements of FIGS. 7 and 8. Thus, when the casing 28 makes one revolution, the shaft 32 makes $1-n$ revolution, or in other words, rotation of the casing 28 with an amplitude W is transmitted, the input shaft 31 being fixed, by a rotation of the output shaft having an amplitude $(1-n)W$ on the condition of course that $1-n$ is not zero, that is to say that $n$ must have a value other than +1. A speed-reduction gear can be employed as in the case of FIGS. 5 to 8 or a reversing gear as in the case of FIG. 9.

Figure 9:
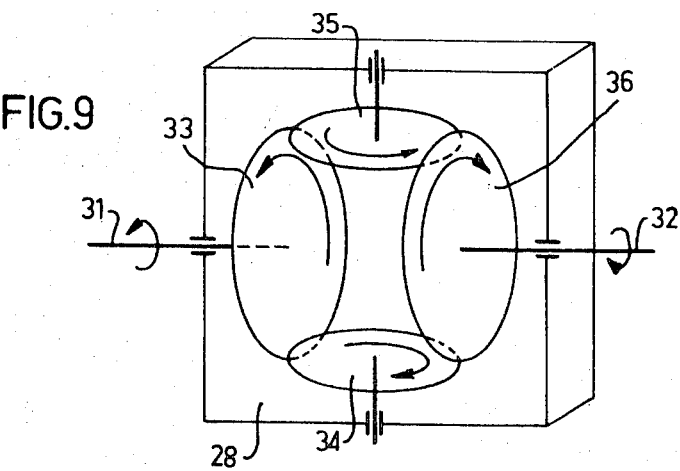
FIG. 9 represents a further example of construction of a casing employed to control the displacements of the carriage according to the invention.

FIG. 9 shows an example of construction of the casing 28 of the differential type which can be subjected, as in the case of the alternative of FIGS. 5 to 8, to an alternating movement. The casing 28 then plays the part of a reversing device, since if it is fixed, the output shaft 32 rotates at the same speed but in the opposite direction to the rotation of the input shaft 31.

The casing 28 being subjected to an alternating movement by the motor-driven speed-reduction gear 30, a horizontal reciprocating motion can therefore be given to the carriage through the intermediary of the wheel 17 and the chain 18.

The motor-driven speed-varying gear 26 drives the shaft 31 with a continuous circular motion which is again found, after passing through the casing 28, reduced $n$ times on the shaft 32. This continuous movement gives a lateral movement to the carriage 16.

Figure 10:
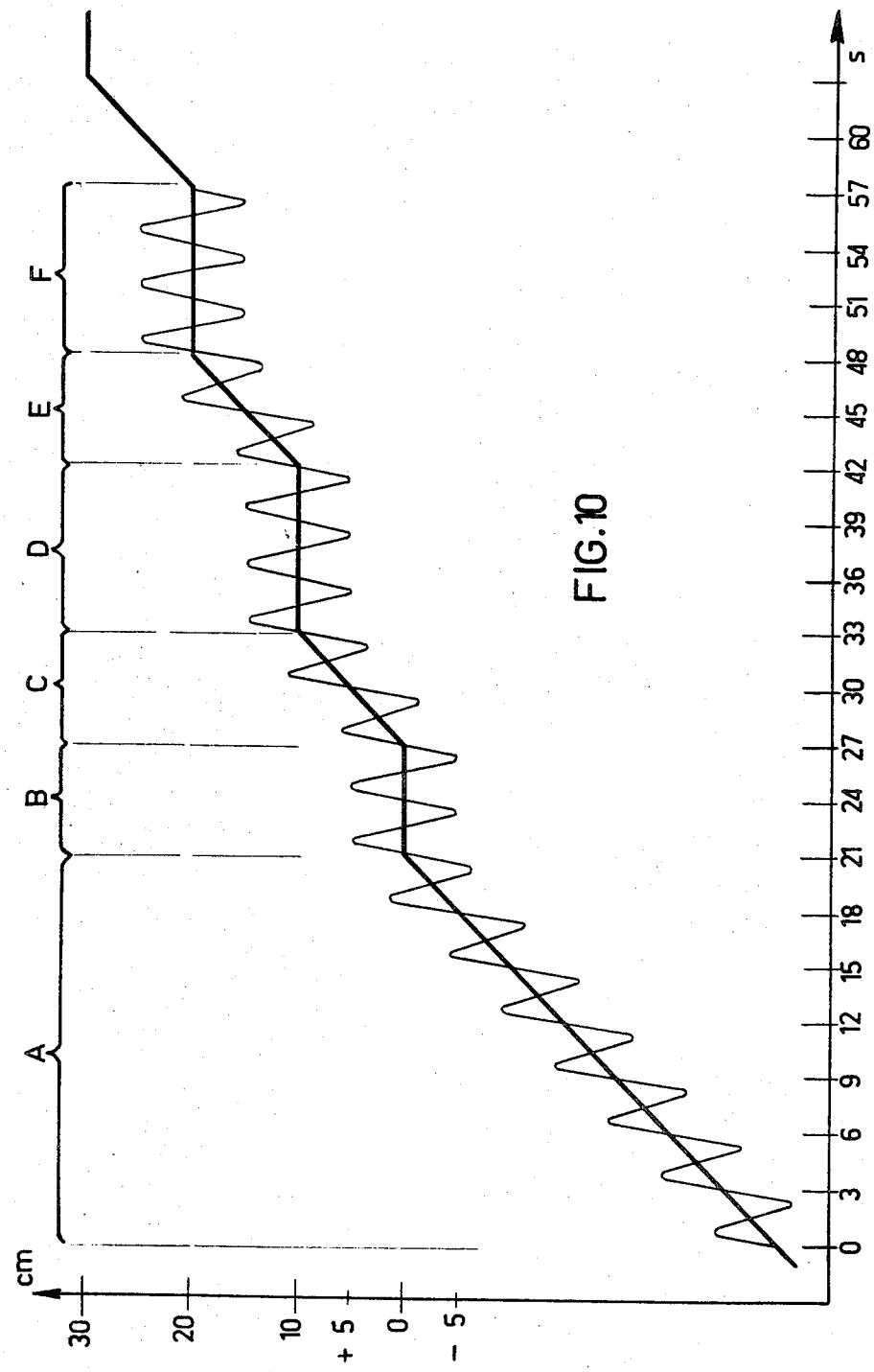
FIG. 10 is a curve representing the distance of the grinding wheel axis with respect to its starting point as a function of time.

The superimposition of the movements supplied by the units 26 and 30 gives the carriage 16 a modulated forward movement which is clearly shown in the graph of FIG. 10 which represents the distance from the axis of the grinding wheel with respect to its starting point in cm., as a function of the time in seconds.

During the course of a first period A of approach of the metal sheet to be cut-up having a thickness MN, shown in FIG. 11, there is a combination of the reciprocating and forward movements of the carriage, the electrical contact 25 being always established by virtue of the constant pressure of the roller 23 on the depth guide 24.

As soon as the grinding wheel 22 is about to encounter the metal sheet, the arm 19 which oscillates freely will be raised as a result of the resistance encountered, which interrupts the electric contact 25 and in consequence stops the forward movement of the carriage. The grinding wheel will thus only be given the reciprocating movement as indicated by the zone B of FIG. 10, which corresponds to the cutting front JH of FIG. 11, which forms an angle of about 30° with the surface of the metal sheet and the grinding wheel will remain in this zone for the whole period necessary for it to cut through the entire thickness of the sheet.

When the metal sheet has been completely cut-up, the electric contact 25 is restored and the carriage will again be subjected to the forward movement, combined of course with the alternating movement, and represented by the zone C. of FIG. 10.

This forward movement of the carriage ceases as soon as the grinding wheel again rides on the sheet. The wheel is then only given an alternating movement, as indicated by the zone D of FIG. 10, which corresponds to the cutting front IJ of FIG. 11, and the wheel will carry out as many to-and-fro movements as may be necessary in order for it to pass through the entire thickness of the metal sheet.

When the sheet has been cut through, the combination of the two movements starts again, as indicated in the zone E until the wheel again rides on the sheet, which corresponds to the zone F, during the course of which the wheel will pass through the sheet along the cutting front KL, etc.

The amplitude of the alternating movement of the carriage is preferably limited to about twice the thickness of the metal sheet to be cut. The grinding wheel shaft, when the latter is supported on the sheet, has then an oscillating movement having a horizontal amplitude at least equal to that of the carriage. The penetration of the wheel into the metal sheet is reduced to a minimum, while remaining greater than the thickness to be cut, so as to limit to the greatest possible extent the friction on the sides of the grinding wheel. For this purpose, the amplitude of the vertical movement of the wheel is advantageously limited to 1.2 times the thickness of the metal sheet.

The instantaneous forward speed must be greater than the maximum cutting speed. As the diameter of the grinding wheel diminishes, the forward impulses on the carriage diminish in frequency, since the grinding wheel cuts more slowly.

By way of non-limitative example, the device according to the invention is capable of cutting-up plated metal sheets comprising 13 mm. of aluminium on 38 mm. of steel, with an amplitude of alternating movement of 100 mm., an instantaneous speed of forward movement of 1 metre per minute and a frequence of alternating movement of 20 strokes per minute.

It is clear that the forms of embodiment described and the diagrams are not in any way limitative and that the elements of the device according to the invention may be replaced by elements which fulfil the same functions.

While a device of this kind is especially recommended for the cutting-off of plated metal sheets, it is also applicable to other sheets or parts whatever the metal may be, by giving a clean and polished cut without heating of the metal by virtue of a point of contact which is always mobile between the grinding wheel and the workpiece to be cut.

I claim:

1. An improved cutting-off machine for metal sheets, comprising a frame supporting a work-table and a horizontal guiding rail located above said work-table and the direction of which is the direction of cutting; a carriage adapted to move along said guiding rail, first means operably connected to said carriage and adapted to give said carriage a reciprocating movement in the direction of cutting; an arm rigidly fixed to said carriage and being capable of pivoting freely about a horizontal axis, perpendicular to said guiding rail; a high speed rotary cutting-off disc having a shaft mounted on the extremity of said arm, said first means further being adapted to act alone or in combination with second means operably connected to said carriage to provide an intermittent movement of translation in the direction of cutting, brought into action by a depth guide for the cutting-off wheel, limiting the downward displacement of this latter.

2. A machine as claimed in claim 1 further including a transmission system comprising an endless chain operably connected to and transmitting its movements to the carriage, said chain being coaxial in driving relationship with a toothed wheel coaxial with an output half-shaft of which can be given intermittently a movement of rotation by a motor-driven speed varying gear, said gear arrangement being continuously subjected to oscillations by said first means which includes a plate-crank assembly actuated by a motor-driven speed-reduction gear, with input and output half-shafts being located on the same axis.

3. A machine as claimed in claim 2, in which said gear arrangement is a speed reducer and comprises four toothed wheels, the first of which has the input shaft as its axis and is in engagement with the second, having a diameter different from that of the first, the axis of which is parallel to that of the first and which is mounted on the same shaft as the third toothed wheel, said third toothed wheel having a diameter different from that of the second and being in engagment with a fourth toothed wheel having a diameter different from that of the third and which is carried by the output half-shaft of the casing which is in the extension of the input half-shaft of said casing.

4. A machine as claimed in claim 2, in which said gear arrangement is a reversing gear arrangement and comprises four toothed wheels arranged as in a differential gear set, that is to say the input and output half-shafts have the same direction and constitute the axes of two toothed wheels of the same diameter which are in engagement with the other two toothed wheels having a diameter different from or equal to that of the preceding and having as their axes the half-shafts of the same direction perpendicular to the direction of the axes of the first two toothed wheels.

* * * * *